US012701469B2

(12) United States Patent
Wu et al.

(10) Patent No.: US 12,701,469 B2
(45) Date of Patent: Aug. 4, 2026

(54) METHOD AND APPARATUS FOR MOBILITY ROBUSTNESS OPTIMIZATION

(71) Applicant: Lenovo (Beijing) Limited, Beijing (CN)

(72) Inventors: Lianhai Wu, Beijing (CN); Mingzeng Dai, Shanghai (CN); Yan Le, Shanghai (CN); Ran Yue, Beijing (CN); Min Xu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 573 days.

(21) Appl. No.: 18/035,836

(22) PCT Filed: Nov. 27, 2020

(86) PCT No.: PCT/CN2020/132211
§ 371 (c)(1),
(2) Date: May 8, 2023

(87) PCT Pub. No.: WO2022/110008
PCT Pub. Date: Jun. 2, 2022

(65) Prior Publication Data
US 2023/0422135 A1     Dec. 28, 2023

(51) Int. Cl.
*H04W 36/00*      (2009.01)
*H04W 36/18*      (2009.01)
(Continued)

(52) U.S. Cl.
CPC ..... *H04W 36/0058* (2018.08); *H04W 36/185* (2023.05); *H04W 36/362* (2023.05); *H04W 74/0816* (2013.01); *H04W 36/00837* (2018.08)

(58) Field of Classification Search
CPC ......... H04W 36/0005; H04W 36/0055; H04W 36/0058; H04W 36/0061; H04W 36/0064;
(Continued)

(56) References Cited

U.S. PATENT DOCUMENTS

| | | | | |
|---|---|---|---|---|
| 2013/0017834 A1* | 1/2013 | Han | ................. | H04W 36/0079 |
| | | | | 455/437 |
| 2015/0045035 A1* | 2/2015 | Nigam | ............. | H04W 72/1268 |
| | | | | 455/436 |

(Continued)

FOREIGN PATENT DOCUMENTS

| | | |
|---|---|---|
| CN | 103702373 A | 4/2014 |
| WO | 2019184621 A1 | 10/2019 |

OTHER PUBLICATIONS

PCT/CN2020/132211 , "International Preliminary Report on Patentability", PCT Application No. PCT/CN2020/132211, Jun. 8, 2023, 6 pages.

(Continued)

*Primary Examiner* — Matthew W Genack
(74) *Attorney, Agent, or Firm* — FIG. 1 Patents

(57)      ABSTRACT

Embodiments of the present disclosure relate to methods and apparatuses for mobility robustness optimization. According to some embodiments of the disclosure, a method may include: performing one of the following handover procedures associated with a target cell: a handover procedure in response to receiving a handover command, a CHO procedure in response to meeting a CHO execution condition, and a DAPS handover procedure in response to receiving a DAPS handover command; accessing the target cell; storing assistant information related to a successful handover to the target cell; and transmitting the assistant information related to the successful handover to the target cell in response to a trigger condition for transmitting assistant information being met. In addition, the target BS may transmit the assistant information related to the successful handover to the source BS over the Xn interface.

20 Claims, 10 Drawing Sheets

(51) Int. Cl.
    *H04W 36/36*       (2009.01)
    *H04W 74/0816*    (2024.01)

(58) Field of Classification Search
    CPC ......... H04W 36/0066; H04W 36/0069; H04W
               36/00692; H04W 36/18; H04W 36/185;
               H04W 36/36; H04W 36/362; H04W
               36/38; H04W 74/08; H04W 74/0808;
                                   H04W 74/0816
    See application file for complete search history.

(56)                        References Cited

U.S. PATENT DOCUMENTS

2016/0205581 A1     7/2016  Lee et al.
2018/0124612 A1*   5/2018  Babaei ................ H04W 74/004
2020/0314732 A1*  10/2020  Park ..................... H04L 5/0055
2021/0337511 A1*  10/2021  Lei ................... H04W 72/0453

OTHER PUBLICATIONS

PCT/CN2020/132211 , "International Search Report and Written Opinion", PCT Application No. PCT/CN2020/132211, Aug. 17, 2021, 7 pages.
20962899.9, "European Search Report", Application No. 20962899.9, Jul. 15, 2024, 14 pages.
Ericsson, "Summary of AI 8.13.2.3—Other WID related SON features", 3GPP TSG-RAN WG2 #111-e R2-2010996, Nov. 2, 2020, 24 pages.
Huawei, Hisilicon, "Discussion on other SON aspects", 3GPP TSG-RAN WG2 Meeting #112 electronic, Nov. 2, 2020, 7 pages.
NTTDOCOMO, Inc., "Discussion on successful handover report", 3GPP TSG-RAN WG2 #112-e R2-2010459, Nov. 2, 2020, 4 pages.

\* cited by examiner

800

| |
|---|
| performing a handover procedure associated with a target cell |
~ 811

| |
|---|
| accessing the target cell |
~ 813

| |
|---|
| storing assistant information related to a successful handover to the target cell |
~ 815

| |
|---|
| transmitting the assistant information related to the successful handover to the target cell in response to a trigger condition for transmitting assistant information is met |
~ 817

900 receiving, from a UE, assistant information related to a successful handover of the UE from a second BS to a first BS — 911 transmitting an Xn message to the second BS in response to the reception of the assistant information — 913

METHOD AND APPARATUS FOR MOBILITY ROBUSTNESS OPTIMIZATION

TECHNICAL FIELD

Embodiments of the present disclosure generally relate to wireless communication technology, especially to methods and apparatuses for mobility robustness optimization (MRO) in a wireless communication system.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In the above wireless communication systems, a base station (BS) can have some cells (or areas) to provide communication service. When a user equipment (UE) moves from a serving cell of a source BS to a target cell of a target BS, a handover procedure may be performed.

When a failure, for example, a radio link failure (RLF) or a handover (HO) failure, occurs at a UE, the UE may perform a radio resource control (RRC) reestablishment procedure. The UE may access a cell by a successful RRC reestablishment procedure. The accessed network (e.g., the serving BS) may request a failure report of the UE, such that one or more aspects related to mobility in a wireless communication network can be optimized.

There is a need for improved mobility robustness in wireless communication networks.

SUMMARY

Some embodiments of the present disclosure provide a method. The method may include: performing one of the following handover procedures associated with a target cell: a handover procedure in response to receiving a handover command, a conditional handover (CHO) procedure in response to meeting a CHO execution condition, and a dual active protocol stack (DAPS) handover procedure in response to receiving a DAPS handover command; accessing the target cell; storing assistant information related to a successful handover to the target cell; and transmitting the assistant information related to the successful handover to the target cell in response to a trigger condition for transmitting assistant information being met.

Some embodiments of the present disclosure provide a method. The method may include: receiving, at a first base station (BS) from a user equipment (UE), assistant information related to a successful handover from a second BS to the first BS; wherein the successful handover is a successful handover triggered by a handover command, a successful conditional handover (CHO), or a successful dual active protocol stack (DAPS) handover.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

Embodiments of the present disclosure provide technical solutions for enhanced MRO, and can facilitate and improve the implementation of various communication technologies such as 5G NR.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
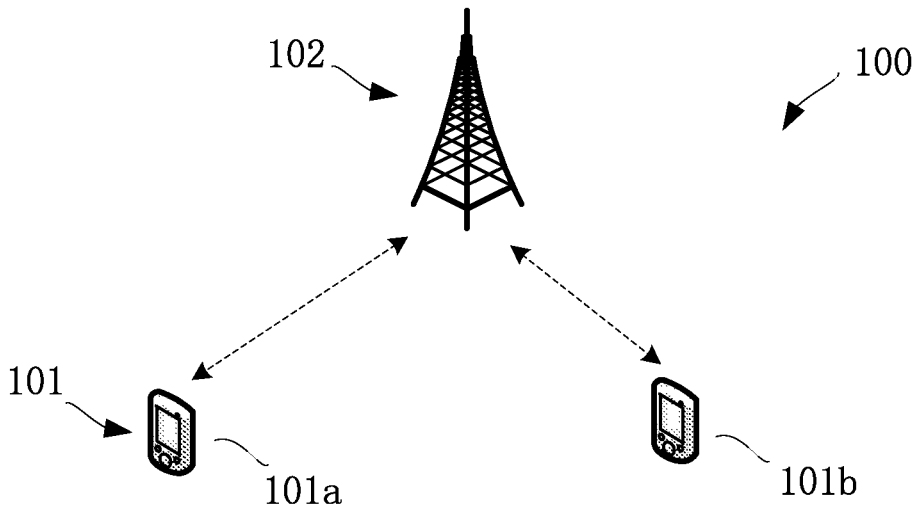
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS s 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

A BS may include one or more cells. A UE may handover from a serving cell of a source BS to a target cell of a target BS. For example, referring to FIG. 1, UE 101a is connected to BS 102. At a certain time, when a handover is needed, for example, when UE 101a is about to move outside of the coverage of BS 102, UE 101a may perform a handover procedure from a serving cell of BS 102 (source BS) to a target cell of another BS (target BS), which is not shown in FIG. 1.

In some embodiments of the present disclosure, a handover procedure at a UE may triggered by a BS using a handover command. For example, BS 102 may transmit a handover command to UE 101a to instruct UE 101a to hand over to a target cell of a target BS. The handover command may be transmitted via an RRC reconfiguration message. In response to the reception of this handover command, the UE 101a may perform a handover procedure and may transmit an RRC reconfiguration complete message to the target BS in response to a successful handover procedure.

In some embodiments of the present disclosure, the handover procedure performed by a UE may be a CHO procedure. A CHO is a handover executed by a UE when one or more handover execution conditions are met. The UE may start evaluating the execution condition(s) in response to receiving a CHO configuration, may perform a CHO execution (or CHO procedure) in response to the execution condition(s) being met, and may stop evaluating the execution condition(s) during the CHO execution.

In some embodiments of the present disclosure, certain principles may be applied to a CHO procedure, including:

The CHO configuration includes configuration of a CHO candidate cell(s) generated by a candidate BS(s) and an execution condition(s) generated by a source BS.

An execution condition may include at least one (e.g., one or two) trigger condition (e.g., Event A3 or Event A5). In some examples, only single reference signal (RS) type is supported and at most two different execution quantities (e.g., RSRP (reference signal received power) and RSRQ (reference signal received quality), RSRP and SINR (signal to interference plus noise ratio), etc.) can be configured simultaneously for the evaluation of the CHO execution condition(s) of a single candidate cell.

Event A3: a neighbor cell of a UE becomes an offset better than a source cell of the UE; and Event A5: a source cell of a UE becomes worse than one threshold and a neighbor cell of the UE becomes better than another threshold.

Before any CHO execution condition is satisfied, in response to the reception of a handover command (without any CHO configuration, e.g., a handover triggered by a BS), the UE executes a handover procedure, regardless of any previously received CHO configuration.

While performing a CHO procedure, the UE does not monitor the source cell, for example, from the time instance when the UE starts synchronization with a target cell.

Figure 2:
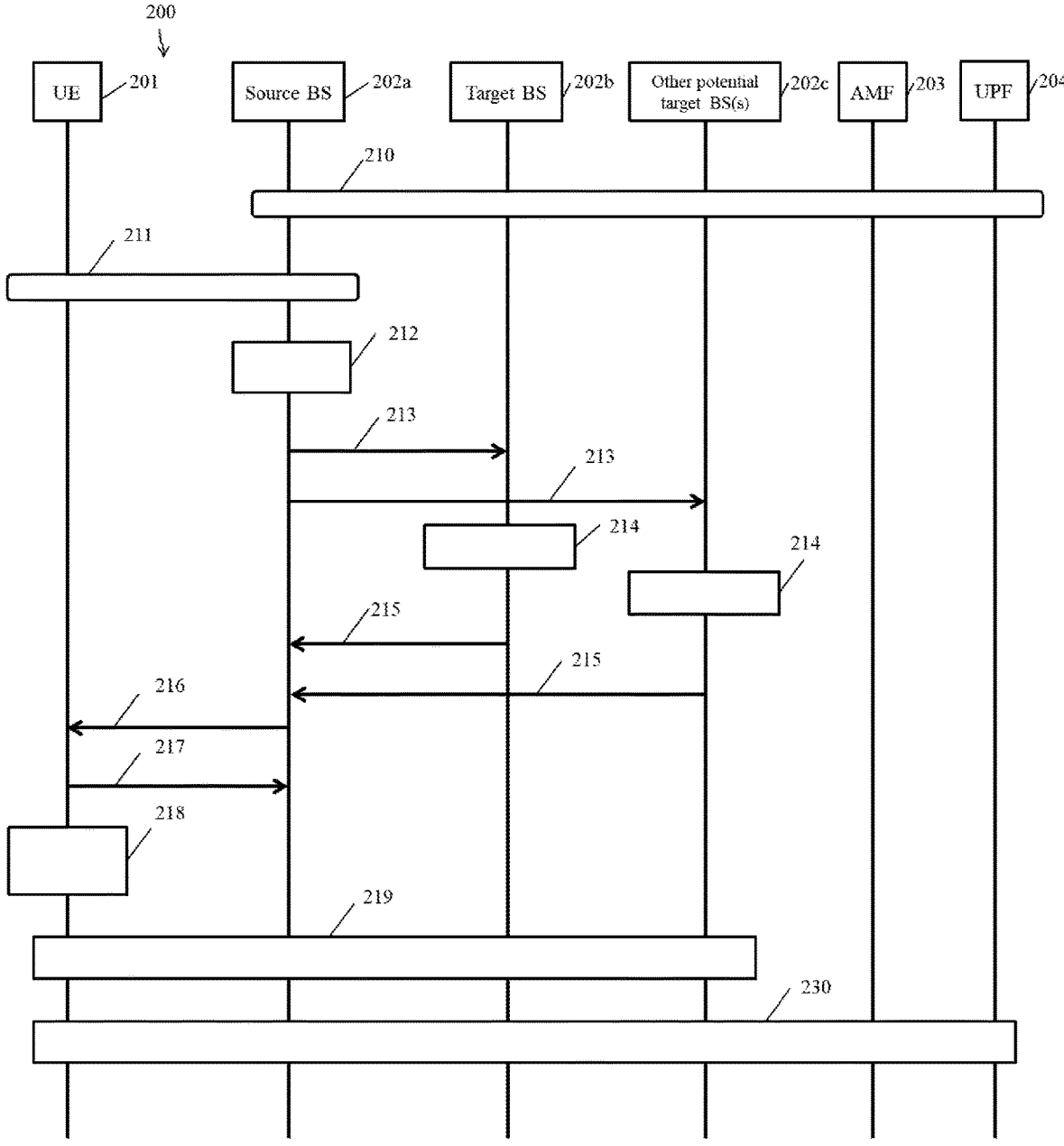
FIG. 2 illustrates an exemplary flowchart of a conditional handover (CHO) procedure in accordance with some embodiments of the present application.

FIG. 2 illustrates an exemplary flowchart of a CHO procedure 200 in accordance with some embodiments of the present application. As shown in FIG. 2, it depicts a basic conditional handover scenario where neither the access and mobility management function (AMF) nor the user plane functions (UPFs) changes.

Referring to FIG. 2, in operation 210, an AMF 213 may provide the UE context of UE 201 to a BS (e.g., source BS 202a). The UE context may contain information regarding roaming and access restrictions of the UE 201. In operation 211, source BS 202a may transmit a measurement configuration to UE 201. UE 201 may report the measurement result to source BS 202a based on the measurement configuration.

In operation 212, source BS 202a may decide to use a CHO for UE 201, which may be based on the measurement result reported by UE 201. In operation 213, source BS 202a may transmit a CHO request message to one or more candidate BS s (e.g., target BS 202b and other potential target BS(s) 202c). In operation 214, target BS 202b and other potential target BS(s) 202c may perform admission control to decide whether to allow the CHO of UE 201 in response to receiving the CHO request message from source BS 202a.

In operation 215, based on the admission control result, target BS 202b and other potential target BS(s) 202c may transmit a CHO response message to source BS 202a. The CHO response message may include CHO configuration for one or more candidate cells.

In operation 216, source BS 202a may transmit an RRC reconfiguration message to UE 201. The RRC reconfiguration message may include a CHO configuration for UE 201. In some embodiments, the CHO configuration may indicate a set of CHO candidate cells, CHO execution condition(s) associated with each candidate cell, and corresponding parameters to perform handover to each candidate cell. The set of candidate cells may include one or more candidate cells provided by target BS 202b and other potential target BS(s) 202c. In response to receiving the RRC reconfiguration message, in operation 217, UE 201 may transmit an RRC reconfiguration complete message to source BS 202a. In some embodiments, more than one candidate cell may be suitable for handover. In this case, UE 201 may select one of the suitable candidate cells for performing a CHO based on, for example, the execution quantity.

In operation 218, UE 201 may maintain the connection with source BS 202a and start evaluating the CHO execution condition(s) for the candidate cell(s). Before any execution condition is satisfied, when a handover command (without any CHO configuration, e.g., a handover triggered by a BS) is received, UE 201 may perform a handover procedure regardless of any previously received CHO configuration information. Otherwise, in the case that at least one execution condition for at least one candidate cell is satisfied, in operation 219, UE 201 may detach from source BS 202a and perform (or apply) a CHO procedure to a selected candidate cell. The selected cell may be referred to as a target cell.

Performing a CHO procedure to the target cell may include applying the corresponding configuration (e.g., parameters for handover) for the target cell, and synchronize to the target cell. UE 201 may complete the CHO procedure by transmitting an RRC reconfiguration complete message to the target BS (e.g., target BS 202b or one of the other potential target BS(s) 202c) of the target cell.

In operation 230, UE 201, source BS 202a, the target BS (e.g., target BS 202b or one of the other potential target BS(s) 202c), and the core network (e.g., AMF 203 and/or UPF 204) may perform data forwarding and a path switch.

It should be appreciated by persons skilled in the art that the sequence of the operations in exemplary procedure 200 may be changed and some of the operations in exemplary procedure 200 may be eliminated or modified, without departing from the spirit and scope of the disclosure.

In some embodiments of the present disclosure, the handover procedure performed by a UE may be a DAPS handover. A DAPS handover procedure may maintain the connection with the source BS after the reception of a handover command associated with a DAPS (hereinafter, "DAPS handover command"), for example, a handover command with DAPS configuration, and until the release of the source cell after a successful random access to the target BS.

During a DAPS handover, a UE may continue to receive DL user data from the source BS until the release of the source cell and continue to transmit the UL user data to the source BS until a successful random access procedure to the target BS. In the case of a DAPS handover failure, the UE may report the DAPS handover failure via the source BS, without triggering an RRC reestablishment procedure if the source link has not been released.

Figure 3:
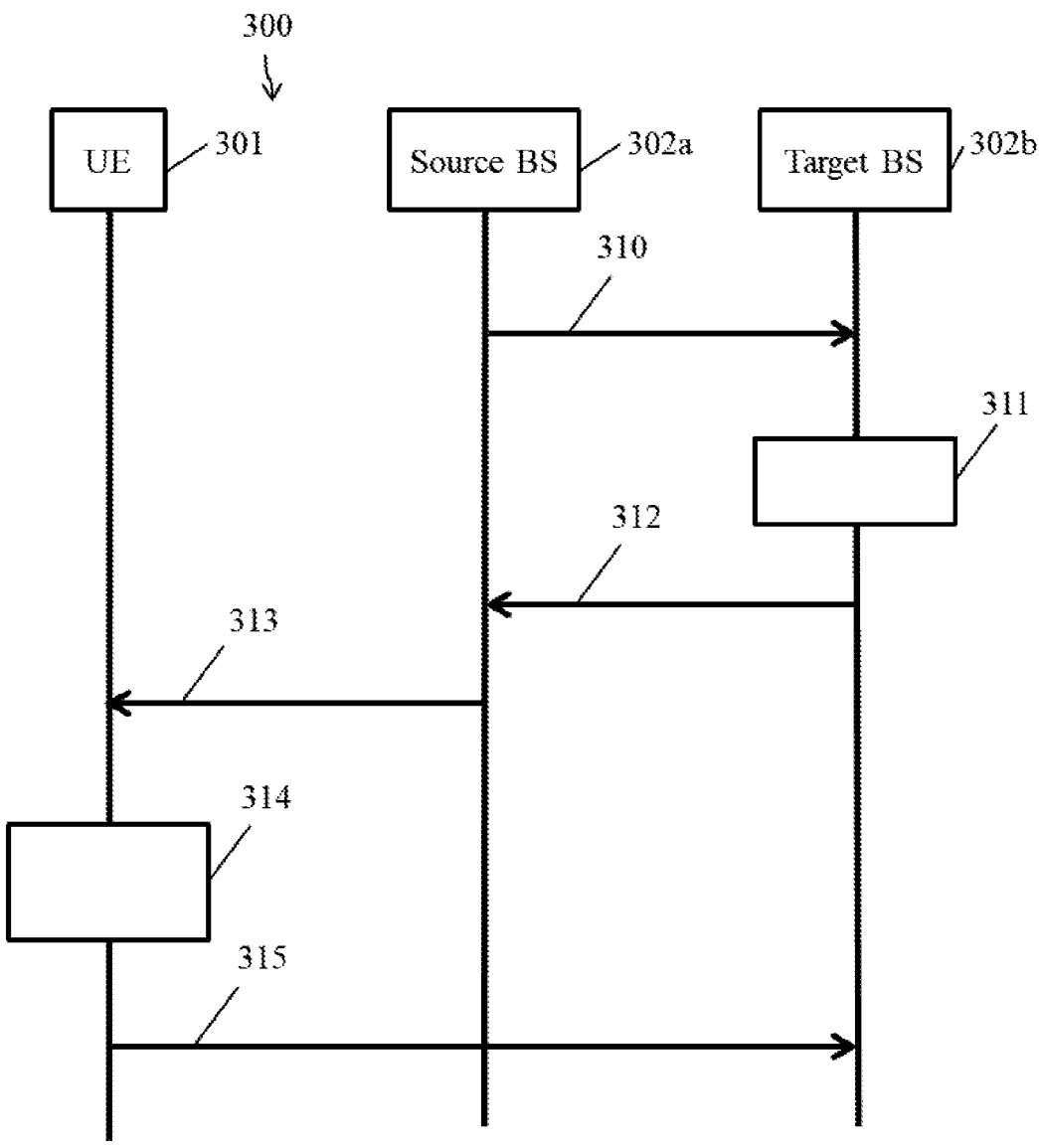
FIG. 3 illustrates an exemplary flowchart of a dual active protocol stack (DAPS) handover procedure in accordance with some embodiments of the present application.

FIG. 3 illustrates an exemplary flowchart of a DAPS handover procedure 300 in accordance with some embodiments of the present application. As shown in FIG. 3, it depicts a basic inter-BS DAPS handover scenario.

Referring to FIG. 3, in operation 310, source BS 302a may transmit a handover request to target BS 302b over the Xn interface. In operation 311, target BS 302b may perform admission control to decide whether to allow the handover procedure of UE 301 in response to receiving the handover request. In operation 312, based on the admission control result, target BS 302b may transmit a handover request acknowledge message including an RRC configuration to source BS 302a.

In operation 313, source BS 302a may transmit an RRC reconfiguration message to UE 301. The RRC reconfiguration message may include a DAPS handover command to hand over to a target cell of target BS 302b. The RRC reconfiguration message may include the RRC configuration from target BS 302b. The RRC reconfiguration message may include at least one cell ID (e.g., target cell ID) and information required to access the target cell of target BS 302b. In this way, UE 301 can access the target cell without reading system information. In some examples, the information required for contention-based and contention-free random access can be included in the RRC reconfiguration message. In some examples, the access information to the target cell may include beam specific information, if any.

In operation 314, UE 301 may switch to the target cell and complete the DAPS handover procedure. In operation 315, UE 301 may establish an RRC connection with target BS 302*b*, and may transmit an RRC reconfiguration complete message to target BS 302*b*.

It should be appreciated by persons skilled in the art that the sequence of the operations in exemplary procedure 300 may be changed and some of the operations in exemplary procedure 300 may be eliminated or modified, without departing from the spirit and scope of the disclosure.

In a wireless communication system, a UE or a BS may operate in both a licensed spectrum and an unlicensed spectrum (also referred to as "shared spectrum"). For a transmission on an unlicensed spectrum, in order to achieve fair coexistence between wireless systems, a channel access procedure (e.g., a listen-before-talk (LBT) procedure) may be required before transmission on the unlicensed spectrum.

The channel access procedure may be performed based on energy detection (or sensing) that evaluates the availability of a channel for performing transmissions. The detection is performed per bandwidth part (BWP) and based on all transmissions (e.g., UL transmission in perspective of a UE) within a BWP. Only when such channel access procedure is successful, can a transmitter (e.g., a UE or BS) start the transmission on the channel and occupy the channel. Otherwise, the transmitter cannot start the transmission and may continue performing a channel access procedure until a successful channel access procedure is obtained. In some embodiments of the present disclosure, when consistent UL channel access procedure failures (e.g., a number of continuous channel access procedure failures) are detected on the UL BWP(s) of a serving cell (e.g., primary cell (PCell) of a UE, the UE may declare a radio link failure (RLF). The number of continuous channel access procedure failures may be configured by a BS or predefined.

In some embodiments of the present disclosure, mobility robustness optimization (MRO) is employed for detecting a connection failure(s) that occur due to, for example, Too Early or Too Late Handovers, or Handover to Wrong Cell. The general procedure may include: after an RLF or a handover failure happens, a UE accesses a new cell by RRC reestablishment or connection setup; in response to the UE entering an RRC connected state, the UE transmits an RLF report, a random access channel (RACH) report, or both to the serving cell; the serving cell transmits a failure indication including the RLF report to the last serving cell; and the RLF report is used to optimize mobility.

In some examples, the problems of Too Early or Too Late Handovers, or Handover to Wrong Cell are defined as follows:

[Too Late Handover] An RLF occurs after the UE has stayed for a long period of time in the cell; and the UE attempts to reestablish the radio link connection in a different cell.

[Too Early Handover] An RLF occurs shortly after a successful handover from a source cell to a target cell or a handover failure occurs during the handover procedure; and the UE attempts to reestablish the radio link connection in the source cell.

[Handover to Wrong Cell] An RLF occurs shortly after a successful handover from a source cell to a target cell or a handover failure occurs during the handover procedure; and the UE attempts to reestablish the radio link connection in a cell other than the source cell and the target cell.

In the above definitions, the "successful handover" refers to the UE's state, for example, the successful completion of the radio access (RA) procedure.

After an RLF or handover failure, a UE may perform reestablishment in a cell. The UE may store information related to the RLF failure and/or handover information. The UE may store the latest RLF report, including both an LTE and NR RLF report, until the RLF report is fetched by the network or for a certain period of time (e.g., 48 hours) after the connection failure is detected. For analysis of connection failures, the UE may make the RLF report available to the network.

Figure 4:
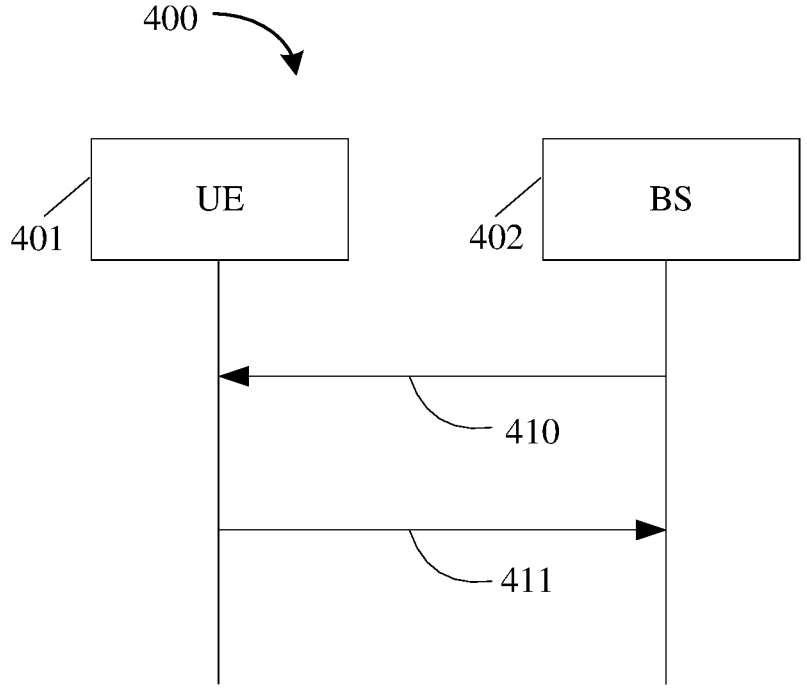
FIG. 4 illustrates an exemplary flowchart of a UE information procedure in accordance with some embodiments of the present application.

FIG. 4 illustrates an exemplary flowchart of a UE information procedure in accordance with some embodiments of the present application.

In FIG. 4, UE 401 may function as the UE 101*a* or UE 101*b* shown in FIG. 1, UE 201 shown in FIG. 2, or UE 301 shown in FIG. 3. BS 402 may function as the BS 102 shown in FIG. 1, BS 202*a*, BS 202*b*, or BS 202*c* shown in FIG. 2, or BS 302*a* or BS 302*b* shown in FIG. 3. Details described in all of the foregoing embodiments of the present disclosure are applicable for the embodiments shown in FIG. 4.

The procedure in FIG. 4 may be used by the network (e.g., a BS) to request a UE to report information. For example, in some embodiments of the present disclosure, a UE (e.g., UE 401 in FIG. 4) may report to its serving cell (e.g., BS 402 in FIG. 4) that RLF information is available. BS 402 may then initiate a UE information procedure.

Referring to FIG. 4, BS 402 may initiate the UE information procedure by transmitting a UE information request message to UE 401 in operation 410. In response to the UE information request message, UE 401 may respond with a UE information response message to the BS 402 in operation 411. The network can optimize the mobility problem based on the response from UE 401. In some examples, the UE information response message may include an RLF report.

It should be appreciated by persons skilled in the art that the sequence of the operations in exemplary procedure 400 may be changed and some of the operations in exemplary procedure 400 may be eliminated or modified, without departing from the spirit and scope of the disclosure.

A failure indication procedure may be initiated, for example, after a UE attempts to reestablish the radio link connection at a BS (BS #2, for example, currently serving BS) after a failure at another BS (BS #1, for example, the last serving BS). BS #2 may initiate a failure indication procedure towards at least one BS which controls cells using a physical cell identifier (PCI) signaled by the UE during the RRC reestablishment procedure. A failure indication may be transmitted to BS #1 of the UE when BS #2 fetches the RLF report from the UE.

The purpose of the failure indication procedure is to transfer information regarding, for example, RRC reestablishment attempts or received RLF reports, between BS s. The signaling may take place from a BS at which a reestablishment attempt is made or an RLF report is received, to another BS to which the UE concerned may have previously been attached prior to the connection failure. This may aid the detection of an RLF case or a handover failure case.

Figure 5:
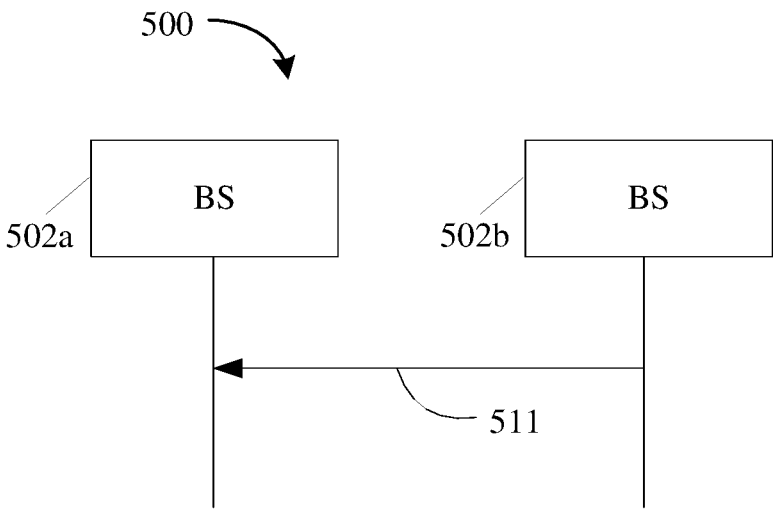
FIG. 5 illustrates an exemplary flowchart of a failure indication procedure in accordance with some embodiments of the present application.

FIG. 5 illustrates an exemplary flowchart of a failure indication procedure 500 in accordance with some embodiments of the present application. In FIG. 5, BS 502*a* and BS 502*b* may function as BS 102 shown in FIG. 1, BS 202*a*, BS 202*b*, or BS 202*c* shown in FIG. 2, or BS 302*a* or BS 302*b* shown in FIG. 3. Details described in all of the foregoing embodiments of the present disclosure are applicable for the embodiments shown in FIG. 5.

Referring to FIG. 5, in certain scenarios such as in response to a reestablishment attempt or the reception of the UE information (e.g., an RLF report) from a UE, BS 502*b* may initiate the procedure 500. For example, when BS 502*b* considers that the UE may have previously suffered from a connection failure at a cell controlled by BS 502*a*, BS 502*b* may initiate the procedure 500. For instance, in operation 511, the BS 502*b* may initiate the procedure 500 by transmitting a failure indication message to BS 502*a*. In some embodiments of the present disclosure, the failure indication message may include a container of an RLF report. The container of the RLF report may include an RLF report received from the UE at the BS 502*b*. In some embodiments of the present disclosure, the failure indication message is transmitted over the Xn interface.

Embodiments of present disclosure provide solutions to enhance the MRO mechanism in wireless communication systems. For example, more robust mobility can be provided by reporting failure events observed during successful handovers (e.g., handover triggered by a BS, a CHO handover, or a DAPS handover). In some embodiments of the present disclosure, a UE may be configured to compile a report associated with a successful handover comprising a set of measurements collected during the handover procedure, including, for example, a measurement(s) at the handover trigger, a measurement(s) at the end of the handover execution, or a measurement(s) after the handover execution.

In some embodiments of the present disclosure, at least one of the following information may be included in the successful handover report:

source cell ID;

target cell ID;

measurement report triggered configuration, including, for example, for example, event ID, trigger threshold, trigger offset, hysteresis value, time-to-trigger (TTT) value;

the radio link quality of the source cell when the measurement report is triggered; (For example, the UE may record the quality of source cell when it is lower than a pre-configured threshold.)

the radio quality of the source cell when a handover command is received before conducting an RACH procedure with the target cell;

the radio quality of the target cell when the RACH procedure with the target cell is successfully performed;

beam failure detection history, including, for example, beam failure instance maximum count, beam failure detection timer, and/or the number of failure detections;

beam failure recovery history, including, for example, beam failure recovery configuration, and/or the number of failure recovery;

Qin/Qout threshold configuration, the count number of N310/N311, elapsed time of a physical layer problem timer (e.g., T310 as specified in 3GPP specifications), and/or elapsed time of a timer for initiating failure recovery based on triggering a measurement report (e.g., T312 as specified in 3GPP specifications);

elapsed time of a handover timer (e.g., T304 as specified in 3GPP specifications); and location information.

The definitions of Qin, Qout, N310, and N311 are defined in 3GPP specifications.

In some embodiments of the present disclosure, the UE may be configured with a trigger condition(s) to compile the successful handover report. In this way, such report would be triggered only when the condition(s) is met, which can allow the UE to report in response to relevant cases, such as underlying issues detected by radio link monitoring (RLM), or beam failure detection (BFD) detected in response to a successful handover event.

In some embodiments of the present disclosure, at least one of the following trigger conditions for transmitting assistant information may be configured:

elapsed time of a handover timer (e.g., T304) or elapsed time of a timer for initiating failure recovery based on triggering a measurement report (e.g., T312) is larger than a pre-configured threshold;

the count number of N310 is larger than a pre-configured threshold; and the count number of a beam failure indication or the count number of a beam failure recovery is larger than a pre-configured threshold.

In some embodiments of the present disclosure, the trigger condition for transmitting assistant information may be dependent on the information to be reported in the successful handover report.

More details on the embodiments of the present disclosure will be illustrated in the following text in combination with the appended drawings.

Figure 6:
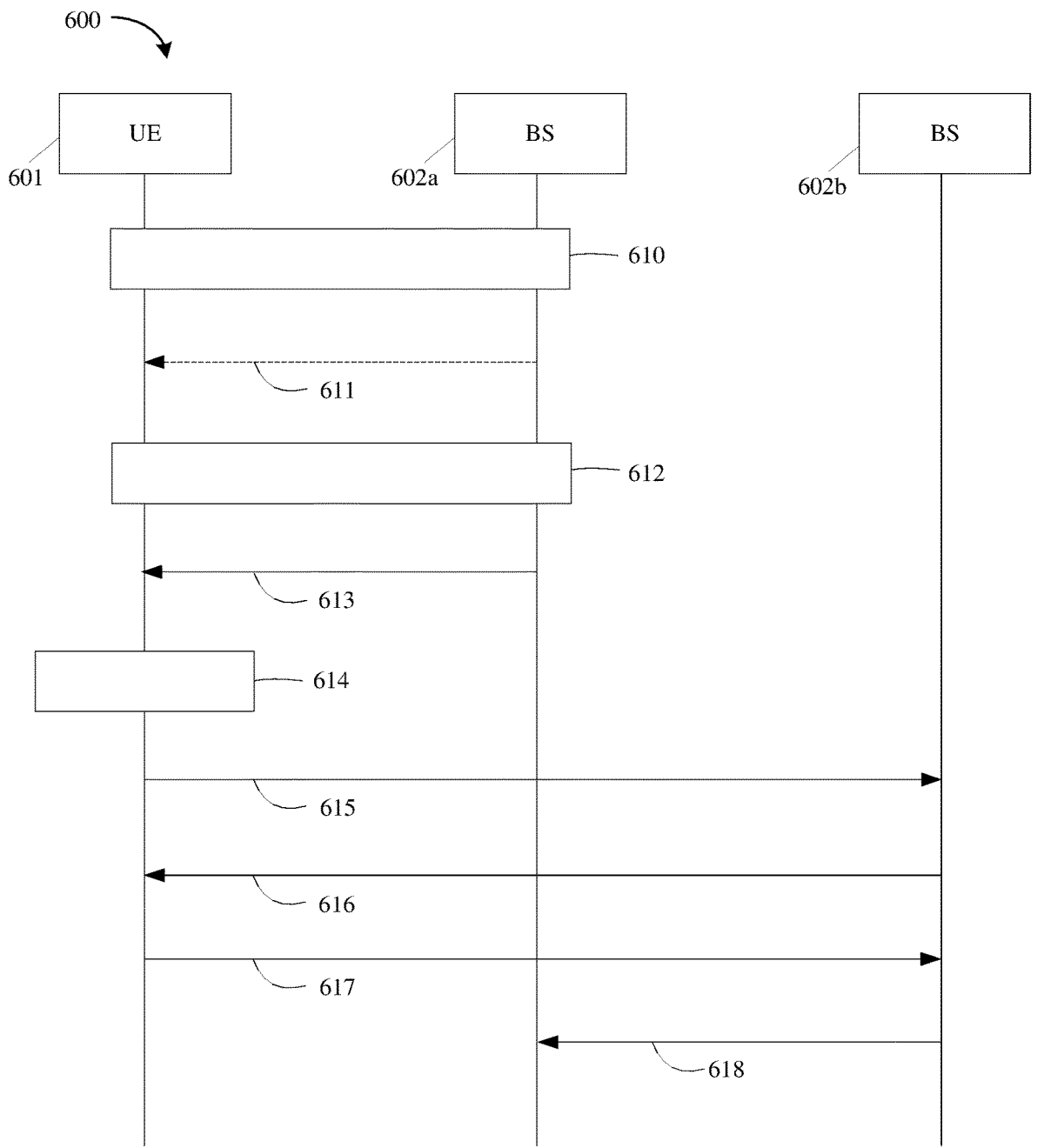
FIG. 6 illustrates an exemplary flowchart of a wireless communication procedure in accordance with some embodiments of the present application.

FIG. 6 illustrates an exemplary flowchart of a wireless communication procedure 600 in accordance with some embodiments of the present application. Details described in all of the foregoing embodiments of the present disclosure are applicable for the embodiments shown in FIG. 6.

Referring to FIG. 6, in operation 610, UE 601 is connected to a cell (source cell) of BS 602*a* (source BS). BS 602*a* may configure UE 601 to report a measurement result to BS 602*a*. In response to the measurement configuration, UE 601 may perform a measurement(s).

In some embodiments of the present disclosure, when UE 601 is connected to BS 602*a*, BS 602*a* may transmit a set of trigger conditions for transmitting assistant information to UE 601. In some embodiments, the set of trigger conditions may be transmitted with the measurement report configuration. As will be further described below, UE 601 may report assistant information related to a successful handover in response to a trigger condition for transmitting assistant information being met. In some embodiments, the successful handover may refer to a successful handover triggered by a handover command or a successful DAPS handover. In some other embodiment of the present disclosure, the set of trigger conditions may be predefined at UE 601.

In some embodiments of the present disclosure, the set of trigger conditions may include at least one of the following:

(1-1) CHO configuration is configured for a UE when the UE performs a handover procedure in response to receiving the handover command;

(1-2) CHO configuration is configured for a target cell associated with a handover;

(1-3) CHO configuration is configured for a UE and a TTT timer has started for at least one CHO candidate cell when the UE performs a handover procedure in response to receiving the handover command;

(1-4) consistent uplink listen-before-talk (LBT) failures are detected on at least one UL bandwidth part (BWP) of a serving cell (e.g., primary cell) of the UE;

(1-5) a channel quality between a UE and a source BS of the UE is greater than a threshold (e.g., TH #1-1) when the UE performs a handover procedure in response to receiving the handover command;

(1-6) a channel quality between a UE and a source BS of the UE is greater than a threshold (e.g., TH #1-2) or less than another threshold (e.g., TH #1-3) when the UE performs a handover procedure in response to receiving the handover command;

(1-7) the number of consecutive in-sync indications is greater than a threshold (e.g., TH #1-4) when a UE performs a handover procedure in response to receiving the handover command;

(1-8) the number of consecutive out-of-sync indications is less than a threshold (e.g., TH #1-5) when a UE performs a handover procedure in response to receiving the handover command;

(1-9) a physical layer problem timer (e.g., T310) is not started when a UE performs a handover procedure in response to receiving the handover command;

(1-10) a timer for initiating failure recovery based on triggering a measurement report (e.g., T312) is not started when a UE performs a handover procedure in response to receiving the handover command;

(1-11) a channel quality of one of at least one serving beam of a UE is greater than a threshold (e.g., TH #1-6) when the UE performs a handover procedure in response to receiving the handover command;

(1-12) a channel quality of each of the at least one serving beam of a UE is greater than a threshold (e.g., TH #1-7) when the UE performs a handover procedure in response to receiving the handover command;

(1-13) a physical layer problem timer (e.g., T310) is started within a period (e.g., P #1-1) after a successful handover;

(1-14) a timer for initiating failure recovery based on triggering a measurement report (e.g., T312) is started within a period (e.g., P #1-2) after a successful handover;

(1-15) the number of consecutive out-of-sync indications is greater than a threshold (e.g., TH #1-8) after a successful handover;

(1-16) the number of preamble attempts in a target cell of a handover is greater than a threshold (e.g., TH #1-9); and (1-17) a value of a physical layer problem timer (e.g., T310) is greater than a threshold (e.g., TH #1-10) when a UE performs a handover procedure in response to receiving the handover command.

In the above trigger conditions, trigger conditions (1-1)-(1-3) may reflect that the CHO execution condition(s) (if configured) is a bit late to trigger, trigger condition (1-4) may reflect a failure of access on the unlicensed spectrum, trigger conditions (1-5)-(1-16) may reflect a bit early handover, and trigger condition (1-17) may reflect a bit late handover.

In some embodiments of the present disclosure, the set of trigger conditions may include at least one of the following:

(2-1) CHO configuration is configured for a UE when the UE performs a DAPS handover procedure in response to receiving the DAPS handover command;

(2-2) CHO configuration is configured for a target cell associated with a DAPS handover;

(2-3) CHO configuration is configured for a UE and a TTT timer has started for at least one CHO candidate cell when the UE performs a DAPS handover procedure in response to receiving the DAPS handover command;

(2-4) consistent uplink listen-before-talk (LBT) failures are detected on at least one UL BWP of a serving cell (e.g., primary cell) of the UE;

(2-5) a channel quality between a UE and a source BS of the UE is greater than a threshold (e.g., TH #2-1) when the UE performs a DAPS handover procedure in response to receiving the DAPS handover command;

(2-6) a channel quality between a UE and a source BS of the UE is greater than a threshold (e.g., TH #2-2) and less than another threshold (e.g., TH #2-3) when the UE performs a DAPS handover procedure in response to receiving the DAPS handover command;

(2-7) the number of consecutive in-sync indications is greater than a threshold (e.g., TH #2-4) when a UE performs a DAPS handover procedure in response to receiving the DAPS handover command;

(2-8) the number of consecutive out-of-sync indications is less than a threshold (e.g., TH #2-5) when a UE performs a DAPS handover procedure in response to receiving the DAPS handover command;

(2-9) a physical layer problem timer (e.g., T310) is not started when a UE performs a DAPS handover procedure in response to receiving the DAPS handover command;

(2-10) a timer for initiating failure recovery based on triggering a measurement report (e.g., T312) is not started when a UE performs a DAPS handover procedure in response to receiving the DAPS handover command;

(2-11) a channel quality of one of at least one serving beam of a UE is greater than a threshold (e.g., TH #2-6) when the UE performs a DAPS handover procedure in response to receiving the DAPS handover command;

(2-12) a channel quality of each of the at least one serving beam of a UE is greater than a threshold (e.g., TH #2-7) when the UE performs a DAPS handover procedure in response to receiving the DAPS handover command;

(2-13) a physical layer problem timer (e.g., T310) is started within a period (e.g., P #2-1) after a successful DAPS handover;

(2-14) a timer for initiating failure recovery based on triggering a measurement report (e.g., T312) is started within a period (e.g., P #2-2) after a successful DAPS handover;

(2-15) the number of consecutive out-of-sync indications is greater than a threshold (e.g., TH #2-8) after a successful DAPS handover;

(2-16) the number of preamble attempts in a target cell of a DAPS handover is greater than a threshold (e.g., TH #2-9); and (2-17) a value of a physical layer problem timer (e.g., T310) is greater than a threshold (e.g., TH #2-10) when the UE performs a DAPS handover procedure in response to receiving the DAPS handover command.

In the above trigger conditions, trigger conditions (2-1)-(2-3) may reflect that the CHO execution condition(s) (if configured) is a bit late to trigger, trigger condition (2-4) may reflect a failure of access on the unlicensed spectrum, trigger conditions (2-5)-(2-16) may reflect a bit early DAPS handover, and trigger condition (2-17) may reflect a bit late DAPS handover.

In some embodiments of the present disclosure, in operation 611 (denoted by dotted arrow as an option), BS 602a may transmit a CHO configuration indicating at least one candidate cell to UE 601. The CHO configuration may be based on the measurement result. In response to the CHO configuration, UE 601 may continue to perform a measurement(s).

In operation 612, UE 601 may report measurement results based on the configuration to BS 602a. BS 602a may determine whether UE 601 should perform a handover or not based on the measurement result. For example, BS 602a may decide to perform a handover when a CHO is not triggered or regardless of any CHO configuration if configured.

In some embodiments of the present disclosure, in operation 613, BS 602 may transmit a handover command to UE 601. The handover command may include a configuration associated with a target cell (e.g., a cell of BS 602b). In response to receiving the handover command, in operation 614, UE 601 may perform a handover procedure. UE 601 may start a handover timer (e.g., T304) in response to receiving the handover command. UE 601 may perform a successful random access to the target cell, and thus access the target cell, which means a successful handover. UE 601 may stop the handover timer in response to a successful random access to the target cell. In some embodiments of the present disclosure, UE 601 may store assistant information related to the successful handover.

In some embodiments of the present disclosure, in operation 613, BS 602 may transmit a DAPS handover command to UE 601. The DAPS handover command may include a DAPS configuration and a configuration associated with a target cell (e.g., a cell of BS 602b). In response to receiving the DAPS handover command, in operation 614, UE 601 may perform a DAPS handover procedure, for example, as described above with respect to FIG. 3. UE 601 may start a handover timer (e.g., T304) in response to receiving the DAPS handover command. UE 601 may perform a successful random access to the target cell, and thus access the target cell, which means a successful DAPS handover. UE 601 may stop the handover timer in response to a successful random access to the target cell. UE 601 may store assistant information related to the DAPS successful handover.

In operation 615, UE 601 may transmit an RRC reconfiguration complete message to BS 602b. In some embodiments of the present disclosure, in response to at least one of the set of trigger conditions for transmitting assistant information being met, UE 601 may transmit an indication that assistant information is available to BS 602b. The indication may be included in the RRC reconfiguration complete message. The indication may indicate at least one of the following: failure information being available; assistant information associated with a successful handover triggered by a handover command being available; assistant information associated with a successful CHO being available; and assistant information associated with a successful DAPS handover being available.

For example, in response to a successful handover and a corresponding trigger condition being met, the indication may indicate assistant information associated with a successful handover triggered by a handover command being available. In response to a successful DAPS handover and a corresponding trigger condition being met, the indication may indicate assistant information associated with a successful DAPS handover being available.

In operation 616, BS 602b may transmit a UE information request message to UE 601 in response to the above-mentioned indication. In operation 617, in response to the UE information request message, UE 601 may transmit a UE information response message including the assistant information to BS 602b.

In some embodiments of the present disclosure, BS 602b may inform UE 601 what UE information is needed by BS 602b. In some embodiments of the present disclosure, BS 602b may determine the UE information needed according to the above-mentioned indication included in, for example, the RRC reconfiguration complete message.

In some embodiments of the present disclosure, the UE information request message may indicate that at least one of the following information is needed: failure information; assistant information associated with successful handover triggered by a handover command; assistant information associated with successful CHO; and assistant information associated with successful DAPS handover. UE 601 may include the required UE information in the UE information response message.

In some embodiments of the present disclosure, the assistant information may include at least one of the following:
CHO related information, including, for example, CHO candidate cell list and/or CHO trigger condition(s);
a time interval between a reception of a CHO configuration indicating a CHO candidate cell and a reception of a handover command for the CHO candidate cell;
at least one ID of at least one UL BWP of a serving cell (e.g., primary cell) of the UE on which consistent uplink LBT failures are detected;
the value of a physical layer problem timer (e.g., T310) started after a successful handover triggered by the reception of a handover command;
the value of a timer for initiating failure recovery based on triggering a measurement report (e.g., T312) started after a successful handover triggered by the reception of a handover command;
the number of consecutive out-of-sync indications after a successful handover triggered by the reception of a handover command;
the number of preamble attempts in a target cell of a handover triggered by the reception of a handover command; and
the value of a physical layer problem timer (e.g., T310) when receiving a handover command.

The above assistant information are assistant information associated with successful handover triggered by a handover command, and may be also referred to as a successful handover report.

In some embodiments of the present disclosure, the assistant information may include at least one of the following:
CHO related information, including, for example, CHO candidate cell list and/or CHO trigger condition(s);
a time interval between a reception of a CHO configuration indicating a CHO candidate cell and a reception of a DAPS handover command for the CHO candidate cell;
at least one ID of at least one UL BWP of a serving cell (e.g., primary cell) of the UE on which consistent uplink LBT failures are detected;
the value of a physical layer problem timer (e.g., T310) started after a successful DAPS handover triggered by the reception of a DAPS handover command;
the value of a timer for initiating failure recovery based on triggering a measurement report (e.g., T312) started after a successful DAPS handover triggered by the reception of a DAPS handover command;
the number of consecutive out-of-sync indications after a successful DAPS handover triggered by the reception of a DAPS handover command;
the number of preamble attempts in a target cell of a DAPS handover triggered by the reception of a DAPS handover command; and
the value of a physical layer problem timer (e.g., T310) when receiving a DAPS handover command.

The above assistant information are assistant information associated with successful DAPS handover, and may be also referred to as a successful DAPS handover report.

In operation 618, in response to receiving the assistant information, BS 602*b* may transmit an Xn message to the source BS (e.g., BS 602*a*). The Xn message may be the failure indication message as described above or a different Xn message. The Xn message may include the report from UE 601. For example, the Xn message may include a container of the report from UE 601. In some embodiments of the present disclosure, the Xn message may further include an indication of an RLF report, a successful handover report, a successful CHO report, or a successful DAPS handover report, depending on, for example, the content of the report. For example, in the case that the report from UE 601 is a successful handover report, the indication in the Xn message indicates a successful handover report. In the case that the report from UE 601 is a successful DAPS handover report, the indication in the Xn message indicates a successful DAPS handover report.

It should be appreciated by persons skilled in the art that the sequence of the operations in exemplary procedure 600 may be changed and some of the operations in exemplary procedure 600 may be eliminated or modified, without departing from the spirit and scope of the disclosure.

Figure 7:
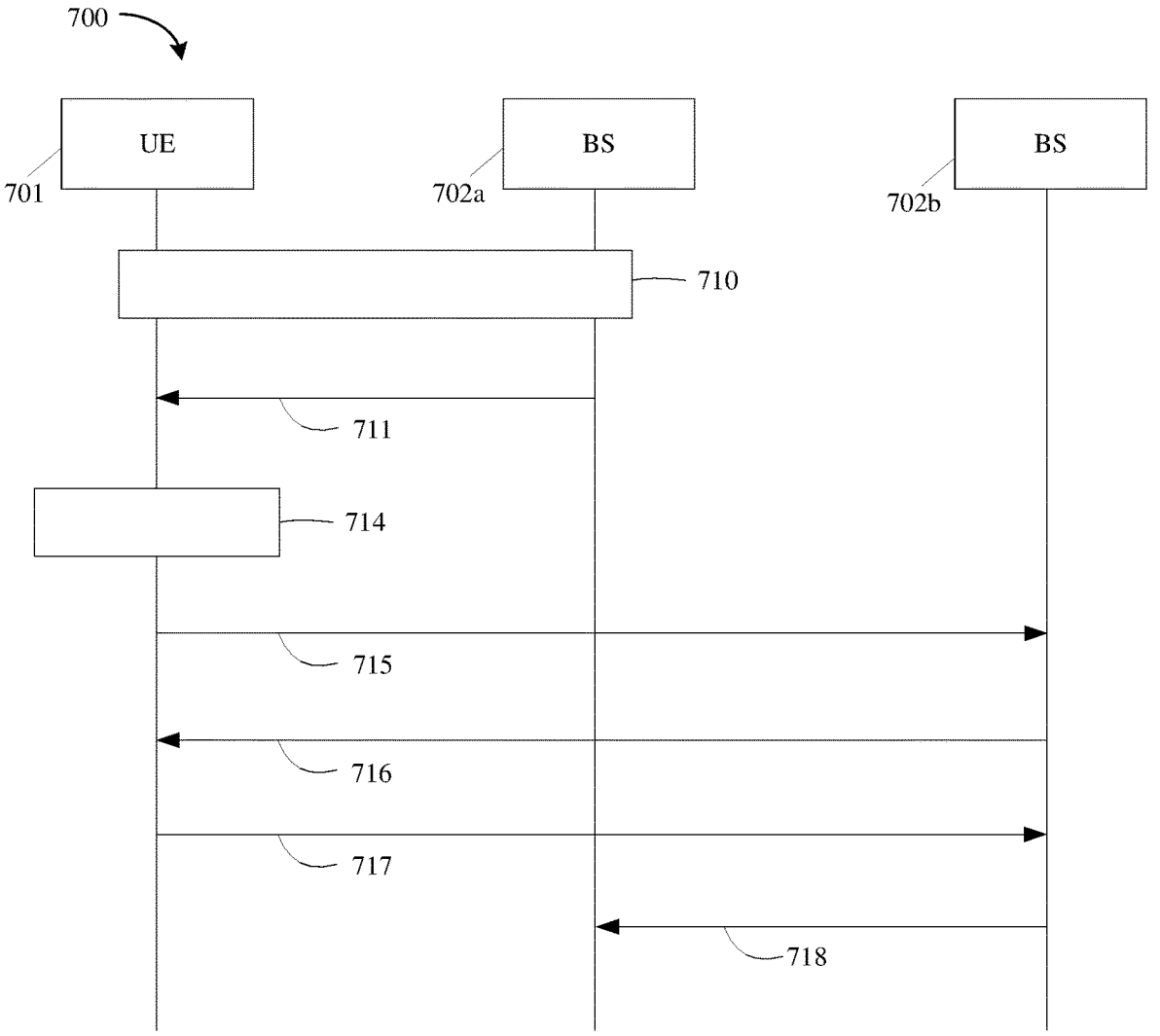
FIG. 7 illustrates an exemplary flowchart of a wireless communication procedure in accordance with some embodiments of the present application.

FIG. 7 illustrates an exemplary flowchart of a wireless communication procedure 700 in accordance with some embodiments of the present application. Details described in all of the foregoing embodiments of the present disclosure are applicable for the embodiments shown in FIG. 7.

Referring to FIG. 7, in operation 710, UE 701 is connected to a cell (source cell) of BS 702*a* (source BS). BS 702*a* may configure UE 701 to report a measurement result to BS 702*a*. In response to the measurement configuration, UE 701 may perform a measurement(s), and may report the measurement result based on the configuration.

In some embodiments of the present disclosure, in operation 711, BS 702*a* may transmit a CHO configuration indicating at least one candidate cell to UE 701. The CHO configuration may be based on the measurement result. In response to the CHO configuration, UE 701 may continue to perform a measurement(s).

In some embodiments of the present disclosure, when UE 701 is connected to BS 702*a*, BS 702*a* may transmit a set of trigger conditions for transmitting assistant information to UE 701. For example, the set of trigger conditions may be transmitted with the measurement report configuration or the CHO configuration. As will be further described below, UE 701 may report assistant information related to a successful CHO handover in response to a trigger condition for transmitting assistant information being met. In some other embodiment of the present disclosure, the set of trigger conditions may be predefined at UE 701.

In some embodiments of the present disclosure, the set of trigger conditions may include at least one of the following:

(3-1) a time interval between a CHO execution and a reception of a corresponding CHO configuration at a UE is less than a threshold (e.g., TH #3-1);

(3-2) a time interval between a CHO execution and a reception of a corresponding CHO configuration at a UE is greater than a threshold (e.g., TH #3-2);

(3-3) a channel quality between a UE and a source BS of the UE is greater than a threshold (e.g., TH #3-3) when a CHO procedure is performed at the UE;

(3-4) a channel quality between a UE and a source BS of the UE is greater than a threshold (e.g., TH #3-4) or less than another threshold (e.g., TH #3-5) when a CHO procedure is performed at the UE;

(3-5) the number of consecutive in-sync indications is greater than a threshold (e.g., TH #3-6) when a CHO procedure is performed at a UE;

(3-6) the number of consecutive out-of-sync indications is less than a threshold (e.g., TH #3-7) when a CHO procedure is performed at a UE;

(3-7) a physical layer problem timer (e.g., T310) is not started when a CHO procedure is performed at a UE;

(3-8) a physical layer problem timer (e.g., T310) is started when a CHO procedure is performed at a UE;

(3-9) a timer for initiating failure recovery based on triggering a measurement report (e.g., T312) is not started when a CHO procedure is performed at a UE;

(3-10) a channel quality of one of at least one serving beam of the UE is greater than a threshold (e.g., TH #3-8) when a CHO procedure is performed at a UE;

(3-11) a channel quality of each of the at least one serving beam of a UE is greater than a threshold (e.g., TH #3-9) when a CHO procedure is performed at the UE;

(3-12) a physical layer problem timer (e.g., T310) is started within a period (e.g., P #3-1) after a successful CHO;

(3-13) a timer for initiating failure recovery based on triggering a measurement report (e.g., T312) is started within a period (e.g., P #3-2) after a successful CHO;

(3-14) the number of consecutive out-of-sync indications is greater than a threshold (e.g., TH #3-10) after a successful CHO; and (3-15) the number of preamble attempts in a target cell of a CHO is greater than a threshold (e.g., TH #3-11).

In the above trigger conditions, trigger condition (3-1) may reflect a bit late CHO configuration, trigger condition (3-2) may reflect a bit early CHO configuration, and trigger conditions (3-3)-(3-15) may reflect that the CHO execution condition(s) is a bit early to trigger.

In operation 714, UE 701 may start evaluating a CHO execution condition(s) for the candidate cell(s). When an execution condition for a candidate cell is met, UE 701 may perform a CHO procedure, and may start a handover timer (e.g., T304). UE 701 may perform a successful random access to a target cell (e.g., a cell of BS 702*b*), and thus access the target cell, which means a successful CHO. UE 701 may stop the handover timer in response to a successful random access to the target cell. In some embodiments of the present disclosure, UE 701 may store assistant information related to the successful CHO.

In operation 715, UE 701 may transmit an RRC reconfiguration complete message to BS 702*b*. In some embodiments of the present disclosure, in response to one of the set of trigger conditions for transmitting assistant information being met, UE 701 may transmit an indication that assistant information is available to BS 702*b*. The indication may be included in the RRC reconfiguration complete message, and may indicate at least one of the following: failure information being available; assistant information associated with a successful handover triggered by a handover command being available; assistant information associated with a successful CHO being available; and assistant information associated with successful DAPS handover being available. For example, in response to a successful CHO and a corresponding trigger condition being met, the indication may indicate assistant information associated with a successful CHO being available.

In operation 716, BS 702*b* may transmit a UE information request message to UE 701 in response to the above-mentioned indication. In operation 717, in response to the UE information request message, UE 701 may transmit a UE information response message including the assistant information to BS 702*b*.

In some embodiments of the present disclosure, BS 702*b* may inform UE 701 what UE information is needed by BS 702*b*. In some embodiments of the present disclosure, BS 702*b* may determine the UE information needed according to the above-mentioned indication included in, for example, the RRC reconfiguration complete message.

In some embodiments of the present disclosure, the UE information request message may indicate that at least one of the following information is needed: failure information; assistant information associated with successful handover triggered by a handover command; assistant information associated with successful CHO; and assistant information associated with successful DAPS handover. UE 701 may include the required UE information in the UE information response message.

In some embodiments of the present disclosure, the assistant information may include at least one of the following:

a time interval between a CHO execution and a reception of a corresponding CHO configuration at a UE;

the value of a physical layer problem timer (e.g., T310) started after a successful CHO;

the value of a timer for initiating failure recovery based on triggering a measurement report (e.g., T312) started after a successful CHO;

the number of consecutive out-of-sync indications after a successful CHO; and the number of preamble attempts in a target cell of a CHO.

The above assistant information are assistant information associated with successful CHO, and may be also referred to as a successful CHO report.

In operation 718, in response to receiving the assistant information, BS 702*b* may transmit an Xn message to the source BS (e.g., BS 702*a*). The Xn message may be the failure indication message as described above or a different Xn message. The Xn message may include the report from UE 701. For example, the Xn message may include a container of the report from UE 701. In some embodiments of the present disclosure, the Xn message may further include an indication of an RLF report, a successful handover report, a successful CHO report, or a successful DAPS handover report, depending on, for example, the content of the report. For example, in the case that the report from UE 701 is a successful CHO report, the indication in the Xn message indicates a successful CHO report.

It should be appreciated by persons skilled in the art that the sequence of the operations in exemplary procedure 700 may be changed and some of the operations in exemplary procedure 700 may be eliminated or modified, without departing from the spirit and scope of the disclosure.

Figure 8:
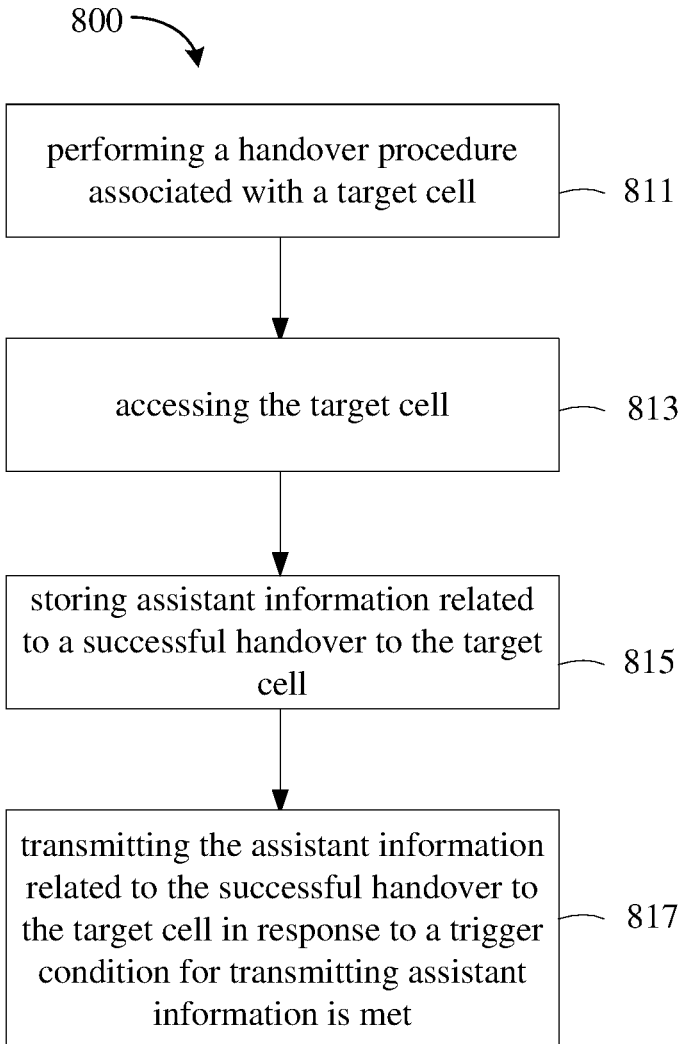
FIG. 8 illustrates an exemplary flowchart of a wireless communication procedure in accordance with some embodiments of the present application.

FIG. 8 illustrates an exemplary procedure 800 for wireless communication in accordance with some embodiments of the present disclosure. Details described in all of the foregoing embodiments of the present disclosure are applicable for the embodiments shown in FIG. 8. In some examples, the procedure may be performed by a UE, for example, UE 601 in FIG. 6 or UE 701 in FIG. 7.

Referring to FIG. 8, in operation 811, a UE may perform a handover procedure associated with a target cell according to one of the methods or procedures described above. For example, the handover procedure may be a handover procedure in response to receiving a handover command, a CHO procedure in response to meeting a CHO execution condition, or a DAPS handover procedure in response to receiving a DAPS handover command.

In some embodiments, a serving BS (source BS) of the UE may transmit a handover command to the UE to instruct a handover to a target cell of a target BS. The UE may perform a handover procedure in response to receiving the handover command. In some embodiments, when the CHO execution condition of a candidate cell is met, the UE may perform a CHO procedure, wherein the candidate cell is the target cell of the CHO procedure. In some embodiments, a serving BS (source BS) of the UE may transmit a DAPS handover command to the UE to instruct a DAPS handover to a target cell of a target BS. The UE may perform a DAPS handover procedure in response to receiving the DAPS handover command.

In operation 813, the UE may access the target cell. The handover procedure associated with the target cell may be successfully completed. In operation 815, the UE may store assistant information related to the successful handover to the target cell. In operation 817, the UE may transmit the assistant information related to the successful handover to the target cell in response to a trigger condition for transmitting assistant information being met. The trigger condition may be configured according to the manners as described above, for example, with respect to FIGS. 6 and 7. The assistant information may include information as described above, for example, with respect to FIGS. 6 and 7.

In some embodiments of the present disclosure, in response to the trigger condition for transmitting assistant information being met, the UE may transmit, to the target cell, an indication that indicates at least one of the following: failure information being available; assistant information associated with a successful handover triggered by a handover command being available; assistant information associated with a successful CHO being available; and assistant information associated with a successful DAPS handover being available.

In some embodiments of the present disclosure, the UE may receive a UE information request message from the target cell in response to the above indication. The target cell may inform the UE what UE information is needed via the UE information request message, as described above. Transmitting the assistant information may include transmitting a UE information response message including the assistant information to the target cell.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
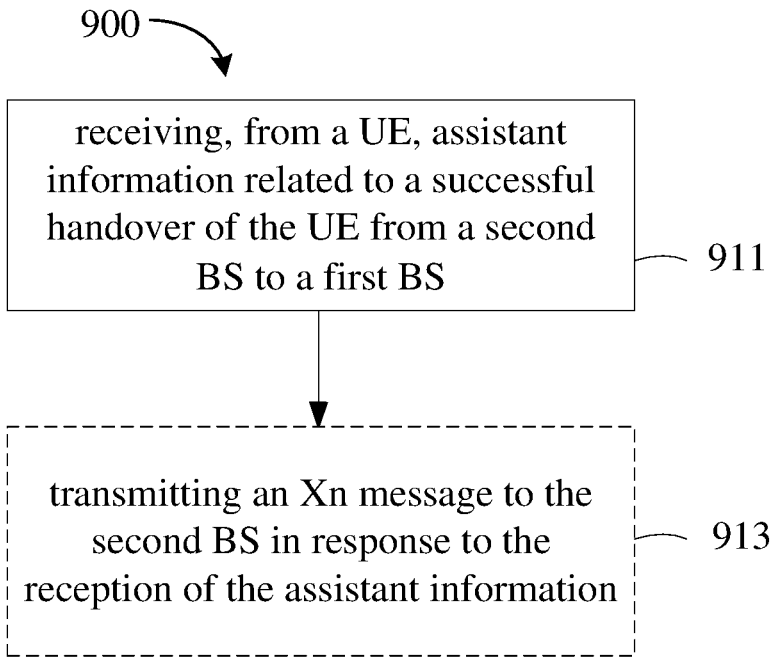
FIG. 9 illustrates an exemplary flowchart of a wireless communication procedure in accordance with some embodiments of the present application.

FIG. 9 illustrates an exemplary procedure 900 for wireless communication in accordance with some embodiments of the present disclosure. Details described in all of the foregoing embodiments of the present disclosure are applicable for the embodiments shown in FIG. 9. In some examples, the procedure may be performed by a BS, for example, BS 602*b* in FIG. 6 or BS 702*b* in FIG. 7.

Referring to FIG. 9, in operation 911, a BS (first BS) may receive, from a UE, assistant information related to a successful handover of the UE from another BS (second BS) to the first BS. The successful handover may be a successful handover triggered by a handover command, a successful CHO, or a successful DAPS handover. The assistant information may include information as described above, for example, with respect to FIGS. 6 and 7.

In some embodiments of the present disclosure, the first BS may receive, from the UE, an indication indicates at least one of the following: failure information being available;

assistant information associated with a successful handover triggered by a handover command being available; assistant information associated with a successful CHO being available; and assistant information associated with a successful DAPS handover being available.

In some embodiments of the present disclosure, the first BS may transmit a UE information request message to the UE in response to the above indication. The first BS may inform the UE what UE information is needed via the UE information request message, as described above. Receiving the assistant information related to the successful handover may include receiving a UE information response message including the assistant information related to the successful handover.

In operation 913 (denoted by dotted block as an option), the first BS may transmit an Xn message to the second BS in response to the reception of the assistant information. The Xn message may include information as described above, for example, with respect to FIGS. 6 and 7.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
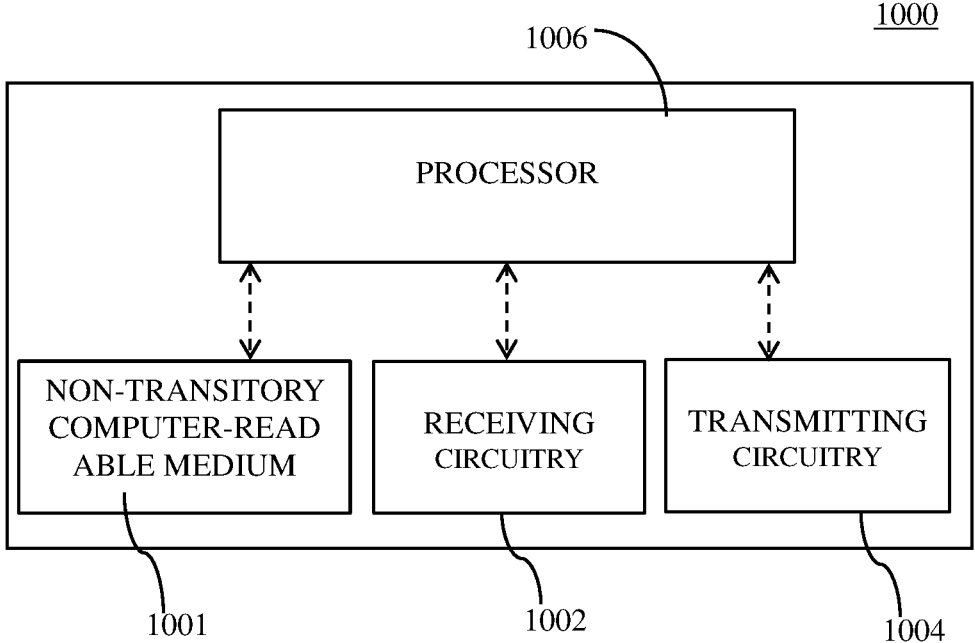
FIG. 10 illustrates a block diagram of an exemplary apparatus in accordance with some embodiments of the present disclosure.

FIG. 10 illustrates a block diagram of an exemplary apparatus 1000 according to some embodiments of the present disclosure.

As shown in FIG. 10, the apparatus 1000 may include at least one non-transitory computer-readable medium 1001, at least one receiving circuitry 1002, at least one transmitting circuitry 1004, and at least one processor 1006 coupled to the non-transitory computer-readable medium 1001, the receiving circuitry 1002 and the transmitting circuitry 1004. The apparatus 1000 may be a base station side apparatus (e.g., a BS) or a communication device (e.g., a UE).

Although in this figure, elements such as the at least one processor 1006, transmitting circuitry 1004, and receiving circuitry 1002 are described in the singular, the plural is contemplated unless a limitation to the singular is explicitly stated. In some embodiments of the present application, the receiving circuitry 1002 and the transmitting circuitry 1004 are combined into a single device, such as a transceiver. In certain embodiments of the present application, the apparatus 1000 may further include an input device, a memory, and/or other components.

In some embodiments of the present disclosure, the non-transitory computer-readable medium 1001 may have stored thereon computer-executable instructions to cause a processor to implement the method with respect to the UEs as described above. For example, the computer-executable instructions, when executed, cause the processor 1006 interacting with receiving circuitry 1002 and transmitting circuitry 1004, so as to perform the operations with respect to the UEs described in FIGS. 1-4 and 6-8.

In some embodiments of the present disclosure, the non-transitory computer-readable medium 1001 may have stored thereon computer-executable instructions to cause a processor to implement the method with respect to the BSs as described above. For example, the computer-executable instructions, when executed, cause the processor 1006 interacting with receiving circuitry 1002 and transmitting circuitry 1004, so as to perform the operations with respect to the BSs described in FIGS. 1-7 and 9.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." The wording "the first," "the second" or the like is only used to clearly illustrate the embodiments of the present application, but is not used to limit the substance of the present application.

What is claimed is:

1. A user equipment (UE) for wireless communication, comprising:

at least one memory; and at least one processor coupled with the at least one memory and configured to cause the UE to:

perform a handover procedure associated with a target cell, the handover procedure comprising at least one of:

a handover procedure in response to receiving a handover command;

a conditional handover (CHO) procedure in response to meeting a CHO execution condition; or a dual active protocol stack (DAPS) handover procedure in response to receiving a DAPS handover command;

access the target cell;

transmit, to the target cell, a radio resource control (RRC) message indicating completion of a successful handover to the target cell;

store assistant information related to the successful handover to the target cell; and transmit, after transmitting the RRC message indicating the completion of the successful handover to the target cell, the assistant information related to the successful handover to the target cell in response to a trigger condition for transmitting the assistant information being met.

2. The UE of claim 1, wherein the trigger condition for transmitting the assistant information comprises at least one of:

CHO configuration being configured for the UE when the UE performs the handover procedure in response to receiving the handover command;

a number of preamble attempts in the target cell of the handover procedure being greater than a first threshold; or a value of a physical layer problem timer being greater than a second threshold when the UE performs the handover procedure in response to receiving the handover command.

3. The UE of claim 1, wherein the trigger condition for transmitting the assistant information comprises at least one of:

a time interval between a CHO execution and a reception of a corresponding CHO configuration at the UE being less than a first threshold;

the time interval between the CHO execution and the reception of the corresponding CHO configuration at the UE being greater than a second threshold;

a channel quality between the UE and a source base station (BS) of the UE is greater than a third threshold when the CHO procedure is performed at the UE;

the channel quality between the UE and the source BS of the UE being greater than a fourth threshold or less than a fifth threshold when the CHO procedure is performed at the UE;

a number of consecutive in-sync indications being greater than a sixth threshold when the CHO procedure is performed at the UE;

a number of consecutive out-of-sync indications being less than a seventh threshold when the CHO procedure is performed at the UE;

a physical layer problem timer being not started when the CHO procedure is performed at the UE;

a physical layer problem timer being started when the CHO procedure is performed at the UE;

a timer for initiating failure recovery based on triggering a measurement report being not started when the CHO procedure is performed at the UE;

a channel quality of one of at least one serving beam of the UE being greater than an eighth threshold when the CHO procedure is performed at the UE;

a channel quality of each of the at least one serving beam of the UE being greater than a ninth threshold when the CHO procedure is performed at the UE;

a physical layer problem timer being started within a first period after a successful CHO;

a timer for initiating failure recovery based on triggering a measurement report being started within a second period after the successful CHO;

the number of consecutive out-of-sync indications being greater than a tenth threshold after the successful CHO; or a number of preamble attempts in the target cell of a CHO being greater than an eleventh threshold.

4. The UE of claim 1, wherein the trigger condition for transmitting the assistant information comprises at least one of:

CHO configuration being configured for the UE when the UE performs the DAPS handover procedure in response to receiving the DAPS handover command;

CHO configuration being configured for the target cell associated with the DAPS handover;

CHO configuration being configured for the UE and a time to trigger (TTT) timer has started for at least one CHO candidate cell when the UE performs the DAPS handover procedure in response to receiving the DAPS handover command;

consistent uplink listen-before-talk (LBT) failures being detected on at least one uplink (UL) bandwidth part (BWP) of a primary cell of the UE;

a channel quality between the UE and a source base station (BS) of the UE being greater than a first threshold when the UE performs the DAPS handover procedure in response to receiving the DAPS handover command;

the channel quality between the UE and a source BS of the UE being greater than a second threshold and less than a third threshold when the UE performs the DAPS handover procedure in response to receiving the DAPS handover command;

a number of consecutive in-sync indications being greater than a fourth threshold when the UE performs the DAPS handover procedure in response to receiving the DAPS handover command;

a number of consecutive out-of-sync indications being less than a fifth threshold when the UE performs the DAPS handover procedure in response to receiving the DAPS handover command;

a physical layer problem timer being not started when the UE performs the DAPS handover procedure in response to receiving the DAPS handover command;

a timer for initiating failure recovery based on triggering a measurement report being not started when the UE performs the DAPS handover procedure in response to receiving the DAPS handover command;

a channel quality of one of at least one serving beam of the UE being greater than a sixth threshold when the UE performs the DAPS handover procedure in response to receiving the DAPS handover command;

a channel quality of each of the at least one serving beam of the UE being greater than a seventh threshold when the UE performs the DAPS handover procedure in response to receiving the DAPS handover command;

a physical layer problem timer being started within a first period after a successful DAPS handover;

a timer for initiating failure recovery based on triggering a measurement report being started within a second period after the successful DAPS handover;

the number of consecutive out-of-sync indications being greater than an eighth threshold after the successful DAPS handover;

a number of preamble attempts in the target cell of a DAPS handover being greater than a ninth threshold; or a value of a physical layer problem timer being greater than a tenth threshold when the UE performs the DAPS handover procedure in response to receiving the DAPS handover command.

5. The UE of claim 1, wherein the at least one processor is configured to cause the UE to:

transmit, to the target cell and in response to the trigger condition for transmitting the assistant information being met, an indication comprising at least one of:

failure information being available;

assistant information associated with the successful handover triggered by the handover command being available;

assistant information associated with a successful CHO being available; or assistant information associated with a successful
DAPS handover being available.

6. The UE of claim 5, wherein the at least one processor
is configured to cause the UE to:
   receive a UE information request message from the target
      cell in response to the indication;
   wherein to transmit the assistant information related to the
      successful handover comprises to transmit a UE infor-
      mation response message including the assistant infor-
      mation related to the successful handover to the target
      cell.

7. The UE of claim 6, wherein the UE information request
message requests at least one of:
   the failure information;
   the assistant information associated with the successful
      handover triggered by the handover command;
   the assistant information associated with the successful
      CHO; or
   the assistant information associated with the successful
      DAPS handover.

8. The UE of claim 1, wherein the assistant information
comprises at least one of:
   CHO related information.

9. The UE of claim 1, wherein the assistant information
includes at least one of:
   a time interval between a CHO execution and a reception
      of a corresponding CHO configuration at the UE;
   a value of a physical layer problem timer started after a
      successful CHO;
   a value of a timer for initiating failure recovery based on
      triggering a measurement report started after the suc-
      cessful CHO;
   a number of consecutive out-of-sync indications after the
      successful CHO; or
   a number of preamble attempts in the target cell of a CHO.

10. A first base station (BS) for wireless communication,
comprising:
   at least one memory; and
   at least one processor coupled with the at least one
      memory and configured to cause the first BS to:
      receive, from a user equipment (UE), a radio resource
         control (RRC) message indicating completion of a
         success handover of the UE from a second BS to the
         first BS; and
      receive, from the UE and after receiving the RRC
         message indicating completion of the successful
         handover of the UE from the second BS to the first
         BS, assistant information related to the successful
         handover of the UE from the second BS to the first
         BS;
      wherein the successful handover comprises at least one
         of a successful handover triggered by a handover
         command, a successful conditional handover (CHO),
         or a successful dual active protocol stack (DAPS)
         handover.

11. The first BS of claim 10, wherein the at least one
processor is configured to cause the first BS to:
   receive, at the first BS from the UE, an indication of at
      least one of:
      failure information being available;
      assistant information associated with the successful
         handover triggered by the handover command being
         available;
      assistant information associated with the successful
         CHO being available; or
      assistant information associated with the successful
         DAPS handover being available.

12. The first BS of claim 11, wherein the at least one
processor is configured to cause the first BS to:
   transmit a UE information request message to the UE in
      response to the indication;
   wherein to receive the assistant information related to the
      successful handover comprises to receive a UE infor-
      mation response message from the UE, wherein the UE
      information response message includes the assistant
      information related to the successful handover;
   wherein the assistant information related to the successful
      handover includes at least one of:
      CHO related information;
      a time interval between a reception of a CHO configu-
         ration indicating a CHO candidate cell and a recep-
         tion of the handover command or the DAPS han-
         dover command for the CHO candidate cell;
      at least one identifier (ID) of at least one uplink (UL)
         bandwidth part (BWP) of a primary cell of the UE on
         which consistent uplink listen-before-talk (LBT)
         failures are detected;
      a value of a physical layer problem timer started after
         the successful handover triggered by the reception of
         the handover command or the successful DAPS
         handover triggered by the reception of the DAPS
         handover command;
      a value of a timer for initiating failure recovery based
         on triggering a measurement report started after the
         successful handover triggered by the reception of the
         handover command or the successful DAPS han-
         dover triggered by the reception of the DAPS han-
         dover command;
      a number of consecutive out-of-sync indications after
         the successful handover triggered by the reception of
         the handover command or the successful DAPS
         handover triggered by the reception of the DAPS
         handover command;
      a number of preamble attempts in a target cell of a
         handover triggered by the reception of the handover
         command or a DAPS handover triggered by the
         reception of the DAPS handover command;
      a value of a physical layer problem timer when receiv-
         ing the handover command or the DAPS handover
         command;
      a time interval between a CHO execution and a recep-
         tion of a corresponding CHO configuration at the
         UE;
      a value of a physical layer problem timer started after
         the successful CHO;
      a value of a timer for initiating failure recovery based
         on triggering a measurement report started after the
         successful CHO;
      a number of consecutive out-of-sync indications after
         the successful CHO; or
      a number of preamble attempts in the target cell of a
         CHO.

13. The first BS of claim 12, wherein the UE information
request message requests at least one of:
   the failure information;
   the assistant information associated with the successful
      handover triggered by the handover command;
   the assistant information associated with the successful
      CHO; or
   the assistant information associated with the successful
      DAPS handover.

14. The first BS of claim 10, wherein the at least one
processor is configured to cause the first BS to:

transmit an Xn message from the first BS to the second BS in response to reception of the assistant information, wherein the Xn message includes the assistant information and an indication of one or more of a successful handover report, a successful CHO report, or a successful DAPS handover report.

15. A method performed by a user equipment (UE), the method comprising:

performing a handover procedure associated with a target cell, the handover procedure comprising at least one of:

a handover procedure in response to receiving a handover command;

a conditional handover (CHO) procedure in response to meeting a CHO execution condition; or a dual active protocol stack (DAPS) handover procedure in response to receiving a DAPS handover command;

accessing the target cell;

transmitting, to the target cell, a radio resource control (RRC) message indicating completion of a successful handover to the target cell;

storing assistant information related to the successful handover to the target cell; and transmitting, after transmitting the RRC message indicating the completion of the successful handover to the target cell, the assistant information related to the successful handover to the target cell in response to a trigger condition for transmitting the assistant information being met.

16. The method of claim 15, wherein the trigger condition for transmitting the assistant information comprises at least one of:

CHO configuration being configured for the UE when the UE performs the handover procedure in response to receiving the handover command;

a number of preamble attempts in the target cell of a handover being greater than a first threshold; or a value of a physical layer problem timer being greater than a second threshold when the UE performs the handover procedure in response to receiving the handover command.

17. The method of claim 15, wherein the trigger condition for transmitting the assistant information comprises at least one of:

a time interval between a CHO execution and a reception of a corresponding CHO configuration at the UE being less than a first threshold;

the time interval between the CHO execution and the reception of a corresponding CHO configuration at the UE being greater than a second threshold;

a channel quality between the UE and a source base station (BS) of the UE is greater than a third threshold when the CHO procedure being performed at the UE;

the channel quality between the UE and the source BS of the UE being greater than a fourth threshold or less than a fifth threshold when the CHO procedure is performed at the UE;

a number of consecutive in-sync indications being greater than a sixth threshold when the CHO procedure is performed at the UE;

a number of consecutive out-of-sync indications being less than a seventh threshold when the CHO procedure is performed at the UE;

a physical layer problem timer being not started when the CHO procedure is performed at the UE;

a physical layer problem timer being started when the CHO procedure is performed at the UE;

a timer for initiating failure recovery based on triggering a measurement report being not started when the CHO procedure is performed at the UE;

a channel quality of one of at least one serving beam of the UE being greater than an eighth threshold when the CHO procedure is performed at the UE;

a channel quality of each of the at least one serving beam of the UE being greater than a ninth threshold when the CHO procedure is performed at the UE;

a physical layer problem timer being started within a first period after a successful CHO;

a timer for initiating failure recovery based on triggering a measurement report being started within a second period after the successful CHO;

the number of consecutive out-of-sync indications being greater than a tenth threshold after the successful CHO; or a number of preamble attempts in the target cell of a CHO being greater than an eleventh threshold.

18. The method of claim 15, wherein the trigger condition for transmitting the assistant information comprises at least one of:

CHO configuration being configured for the UE when the UE performs the DAPS handover procedure in response to receiving the DAPS handover command;

CHO configuration being configured for the target cell associated with the DAPS handover;

CHO configuration being configured for the UE and a time to trigger (TTT) timer has started for at least one CHO candidate cell when the UE performs the DAPS handover procedure in response to receiving the DAPS handover command;

consistent uplink listen-before-talk (LBT) failures being detected on at least one uplink (UL) bandwidth part (BWP) of a primary cell of the UE;

a channel quality between the UE and a source base station (BS) of the UE being greater than a first threshold when the UE performs the DAPS handover procedure in response to receiving the DAPS handover command;

the channel quality between the UE and the source BS of the UE being greater than a second threshold and less than a third threshold when the UE performs the DAPS handover procedure in response to receiving the DAPS handover command;

a number of consecutive in-sync indications being greater than a fourth threshold when the UE performs the DAPS handover procedure in response to receiving the DAPS handover command;

a number of consecutive out-of-sync indications being less than a fifth threshold when the UE performs the DAPS handover procedure in response to receiving the DAPS handover command;

a physical layer problem timer being not started when the UE performs the DAPS handover procedure in response to receiving the DAPS handover command;

a timer for initiating failure recovery based on triggering a measurement report being not started when the UE performs the DAPS handover procedure in response to receiving the DAPS handover command;

a channel quality of one of at least one serving beam of the UE being greater than a sixth threshold when the UE performs the DAPS handover procedure in response to receiving the DAPS handover command;

a channel quality of each of the at least one serving beam of the UE being greater than a seventh threshold when

---

27 the UE performs the DAPS handover procedure in response to receiving the DAPS handover command;

the physical layer problem timer being started within a first period after a successful DAPS handover;

a timer for initiating failure recovery based on triggering a measurement report being started within a second period after the successful DAPS handover;

the number of consecutive out-of-sync indications being greater than an eighth threshold after the successful DAPS handover;

a number of preamble attempts in the target cell of a DAPS handover being greater than a ninth threshold; or a value of the physical layer problem timer being greater than a tenth threshold when the UE performs the DAPS handover procedure in response to receiving the DAPS handover command.

19. The method of claim 15, further comprising:

transmitting, to the target cell and in response to the trigger condition for transmitting assistant information being met, an indication comprising at least one of:

failure information being available;

28 assistant information associated with the successful handover triggered by the handover command being available;

assistant information associated with a successful CHO being available; or assistant information associated with a successful DAPS handover being available.

20. A method performed by a first base station (BS), the method comprising:

receiving, from a user equipment (UE), a radio resource control (RRC) message indicating completion of a successful handover of the UE from a second BS to the first BS; and receiving, from the UE and after receiving the RRC message indicating completion of the successful handover of the UE from the second BS to the first BS, assistant information related to the successful handover of the UE from the second BS to the first BS;

wherein the successful handover comprises at least one of a successful handover triggered by a handover command, a successful conditional handover (CHO), or a successful dual active protocol stack (DAPS) handover.

* * * * *